A. S. DWIGHT.
CONVEYING APPARATUS.
APPLICATION FILED APR. 30, 1910.
1,027,111.
Patented May 21, 1912.
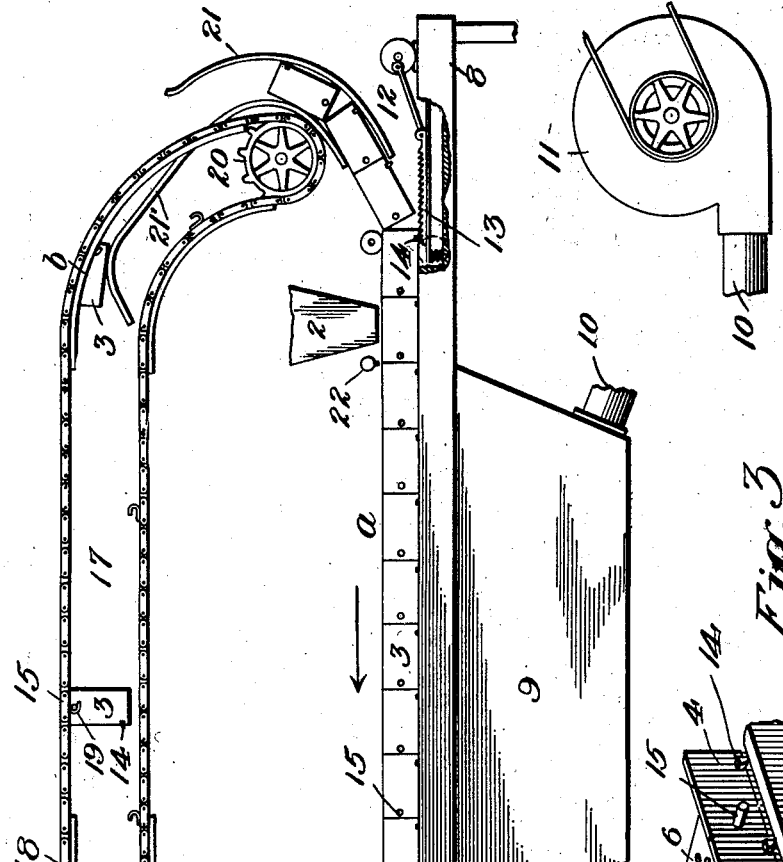
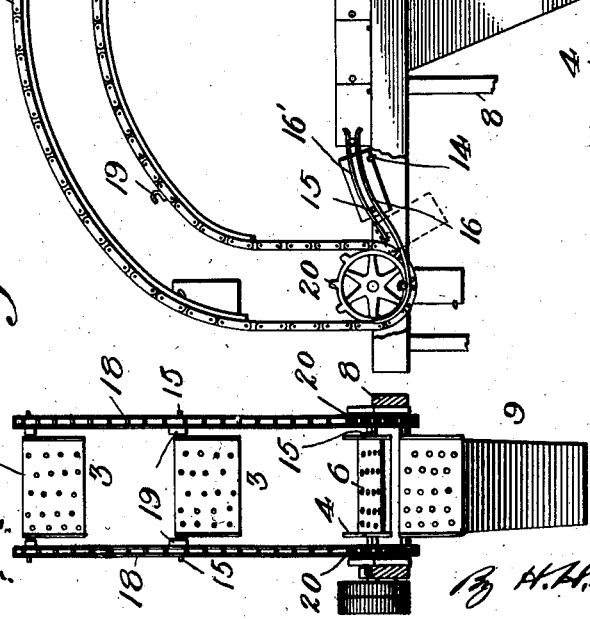
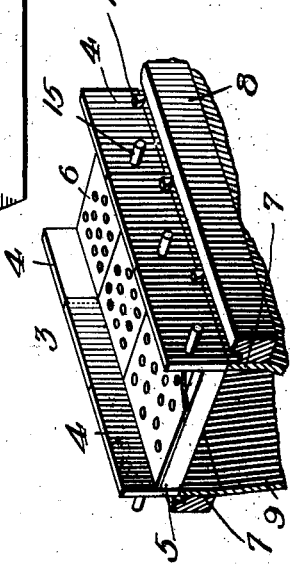

UNITED STATES PATENT OFFICE.

ARTHUR S. DWIGHT, OF NEW YORK, N. Y., ASSIGNOR TO DWIGHT & LLOYD METALLURGICAL COMPANY, A CORPORATION OF NEW JERSEY.

CONVEYING APPARATUS.

1,027,111.      Specification of Letters Patent.      Patented May 21, 1912.

Application filed April 30, 1910. Serial No. 558,621.

*To all whom it may concern:*

Be it known that I, ARTHUR S. DWIGHT, citizen of the United States, residing at New York, in the county of New York and State of New York, have invented certain new and useful Improvements in Conveying Apparatus, of which the following is a specification, reference being had therein to the accompanying drawing.

This invention relates to conveying mechanism which is adapted for a wide variety of practical uses but which has been especially devised for the handling of ore during the desulfurizing and sintering thereof, the conveyer being illustrated in combination with elements of apparatus that are utilized in the particular use to which the invention is put as illustrated in the accompanying drawing.

As examples of the continuous treatment of material in which the conveyer herein illustrated may be employed, the following may be referred to, namely, the drying of various materials such as screened and washed coal, the burning of lime, and the treatment of other substances by heat or moving volumes of air or other gaseous fluids.

In the accompanying drawings—Figure 1 is a side elevation of an apparatus embodying my improvements. Fig. 2 is an end view of the apparatus. Fig. 3 is a detached view, in perspective, of one of the movable conveying elements, herein referred to as a pallet.

The material to be treated, which for the purposes of describing the invention will in this specification be considered to be a sulfid ore that is to be desulfurized and sintered, is delivered in a loose condition from a hopper or storage bin 2 to the conveyer which consists essentially of a series of pallets or comparatively small carriers, each independent of the other, so far as their being connected together is concerned, although under certain conditions of operation, a series of such pallets arranged end to end, coöperate to constitute a substantially continuous carrier, of a length determined by the use to which the conveyer is being put and by the supports upon which the pallets may be traveling. These pallets, each indicated as a whole by 3, are open box-like structures having side walls 4 connected by cross pieces 5. Upon these cross pieces are supported the bottom pieces 6 for supporting the material which the conveyer is to transport. In the form of the invention being described, these bottom pieces are perforated grates. The pallets are preferably without end walls so that when a series of pallets are brought together end to end, as indicated at *a* in Fig. 1, they constitute a continuous trough-like holder.

The pallets are arranged to be supported by and travel along tracks 7 supported by suitable framework 8, and for some uses of the invention, as that illustrated, it is desirable that the pallets when in series, as at *a*, and traveling above the tracks 7, should move in such close engagement with the latter as to form practically air-tight joints therewith. To this end the lower edges of the side walls of the pallets are preferably planed smooth, as are also the upper edges of the tracks, so that these co-acting edges fit one another accurately. The edges of the ends of the side walls of the pallets should also fit each other closely, and practically air-tightly, when the pallets are arranged together in end to end series. In their travel along the tracks 7 the pallets pass an air box 9 which constitutes an element of an air-moving system. This air box is represented as being between and below the tracks and connected by an air trunk 10 with a suction fan 11. These means may be considered as generic illustrations of apparatus for causing the desired treatment of the material being transported by the conveyer, though they are specifically adapted for use in desulfurizing and sintering ore. The independent pallets, in train or series, as represented at *a*, are moved slowly along the tracks 7 by suitable apparatus. That which I have illustrated consists of a reciprocating driver, designated as an entirety by 12, and having a ratchet pawl 13 which is adapted to engage with a projection or projections 14 carried by each pallet.

The tracks 7 are preferably horizontal, though they might be inclined downward in the direction of the movement of the train of conveyer elements to lessen the work of the driving apparatus. After passing the tracks 7, which are represented as defining the course where the pallets are active as conveying elements, they should be moved so as to respectively discharge whatever they may be carrying, and then be returned, one at a time, to position to again take their course along the tracks 7 or where they are active.

I will now describe the means for effecting the separation of the pallets successively from the train or series a and the delivery of them individually to the head end of the apparatus to be again brought into the series a for active use.

15 15 are projections extending out transversely from the side walls 4 of the pallets. These projections are preferably in the form of pins or studs, and are located near the forward ends of the pallets as they travel in the direction indicated by the arrow in Fig. 1.

16, 16' are guides with which the projections 15 engage as the pallets come to the ends of the tracks 7. These guides are preferably curved so as to cause the leading ends of the pallets to tip downward as the pallets are pushed off the guides. This is for the purpose of breaking off the cake or mass of sintered ore contained in the end pallet from that carried by the next succeeding one so that the ore may be discharged as the pallet leaves the series a.

17 represents an endless conveyer. This may conveniently be formed of a pair of sprocket chains 18 supported upon and engaging with wheels 20 and carrying at intervals the hooks 19. The conveyer 17 is arranged to pick up the individual pallets as they leave the series a and convey them back to a position where they may successively again take their place at the head end of the series. The conveyer is driven by any suitable means and preferably at a speed which will move the individual pallets faster than they travel along the tracks 7 so that, while the pallets are in engagement end to end when upon the tracks they are well separated from each other while being returned. The guides 16 16' are so situated with reference to the sprocket wheel 20 at the discharge end of the apparatus that the hooks 19 come into engagement with the projections 15 shortly after the pallet separates from the series a and entirely leaves the tracks 7. When this separation of the leading pallet from the train or series takes place, and it is supported wholly by the conveyer 17, in conjunction with the guides 16, the pallet swings upon the projecting pins 15, which then constitute its pivotal supports, so as to readily discharge its load, as indicated in dotted lines in Fig. 1.

The conveyer 17, constituting pick up and return means for the individual pallets, extends from the rear or discharge end of the apparatus to the forward or feed end thereof and is preferably located above the tracks 7 and in the same vertical planes as they are. The forward end of the conveyer inclines downward quite sharply so that when the pallets reach this part of the run of the conveyer they will move forward, under the influence of gravity, at a speed greater than that of the feed, and hence will separate themselves from the hooks 19. A guide chute 21 of suitable form receives and directs the pallets from the forward delivery end of the conveyer to the forward end of the tracks 7 where they are successively pushed forward into the train or series a by the driving mechanism 12. The inner member or element 21' of the guide chute 21 is arranged to tilt the pallet from the position which it occupies when freely suspended by the hooks 19, to the position indicated at b, Fig. 1, in order that the pallet shall enter the chute in such position that when passed to the trackway it shall be right side up and with its leading end forward.

22 designates a gas pipe provided with flame orifices or jet nozzles and serving as a means of igniting the body of ore at its surface after it has been fed to the conveyer. The supports for the endless conveyer need not be illustrated in detail nor described, since they may be of any preferred or approved character and may be supplied by any one skilled in the art. The conveyer constitutes a means for directing the course of, as well as transporting the individual elements of the conveyer from the discharge to the feed end of the apparatus. But a brief description of the operation of the apparatus shown in the drawings will be necessary to understand the working of the invention. The ore is gradually fed from the hopper 2 to the pallets where it accummulates in a layer continuous from pallet to pallet if they are formed without end walls as shown and described. At about the time a pallet reaches the vertical plane of the forward edge of the air box 9 it is ignited at its upper surface, the ore being, it is supposed, one which contains a combustible element or ingredient, such as sulfur. As the pallets move slowly across the open end of the air box air or other combustion-supporting gas is caused by the fan 11 to pass through the ore, the perforated grates permitting this and the tight fitting of the side walls of the pallets, one with the other, and each with the tracks 7, insuring that the air currents shall pass through the body of the ore. The speed of the apparatus is so adjusted that by the time the pallet has reached the far end of the air box the entire mass of ore has been desulfurized and sintered and is in the form of a porous cake or biscuit well adapted for handling and subsequent treatment in a blast furnace. The successive separations of the pallets from the series, as has been described, causes the breaking up of the sinter into pieces of convenient size and shape and their successive discharge from the pallets.

There are many practical advantages incident to a form of conveyer such as described, which as has been stated is adapted for a wide variety of uses, some of which advantages may be stated. Since each element of the conveyer is small in size and of very simple construction, and entirely independent, so far as being linked with or permanently connected to other similar elements, as in conveyers now in common use, the injury or breakage of any single element does not necessitate the stoppage of the working of the entire apparatus or seriously interfere therewith, as in earlier types of conveyers. Any element can be removed from the apparatus while upon the conveyer 17, or while in the guide chute 21, and another substituted in its place at any time and without stopping the working of the apparatus. Indeed one or more of the pallets could be entirely removed without others being substituted, and yet the apparatus would be as efficient as before their removal.

What I claim is:

1. A conveying apparatus comprising a movable, open, trough-like carrier for loose material formed of a series of independent disconnected elements arranged to be brought together end to end, and means for taking the said elements one at a time from the discharge end of the said series and transporting them to the feed end thereof, substantially as set forth.

2. A conveying apparatus comprising a series of independent disconnected elements arranged to be brought together end to end to form an open substantially continuous carrier for loose material, and means for successively separating the leading element from, and without disturbing the rest of, the series to permit a discharge therefrom of the material being conveyed, and means for returning the said separated elements to the feed end of the apparatus.

3. In a conveying apparatus, a series of independent disconnected elements arranged to be brought together end to end to form a substantially continuous carrier adapted to receive loose material, a trackway along which the said elements are moved while in active operation, in close end to end arrangement, and return means for directing the said elements from the discharge to the feed end of the said trackway.

4. In a conveying apparatus, a series of independent disconnected elements arranged to be brought together end to end to form a substantially continuous carrier which is adapted to receive and convey loose material, a trackway along which the said elements, while in active operation, are moved, in close end to end arrangement to form said continuous carrier, means for moving the said continuous carrier at a relatively slow speed, and means for successively separating the elements one at a time from the discharge end of the continuous carrier and for transporting them to the feed end thereof at a speed greater than that at which they are moved when arranged in series as a carrier.

5. In a conveying apparatus, a series of independent disconnected carrying elements arranged to be brought together end to end to form a substantially continuous carrier adapted to receive loose material, a trackway along which they travel when in said end to end arrangement, and means for returning the carrying elements independently one of the other from the discharge end of the track to the feed end thereof, the said returning means being arranged above the trackway.

6. In a conveying apparatus, a series of independent disconnected elements arranged to be brought together end to end to form a substantially continuous carrier which is adapted to receive and convey loose material, a trackway by which the said elements when arranged to form a continuous carrier are supported and directed, and means for separating the said elements from the leading end of the series constituting the continuous carrier, and for returning them to the head end of the apparatus, the returning means being arranged to support the carriers in position to discharge their contents.

7. In a conveying apparatus, a series of independent disconnected elements arranged to be brought together end to end to form a substantially continuous carrier which is adapted to receive and convey loose material, a trackway by which the said elements when arranged to form a continuous carrier are supported and directed, and an endless moving carrier means arranged to take the individual carrying elements from the tail end of the apparatus and deliver them to the head end thereof, the said carrying means being arranged to support the carrying elements in position to discharge their contents.

8. In a conveying apparatus, a series of independent disconnected elements arranged to be brought together end to end to form a substantially continuous carrier which is adapted to receive and convey loose material, a trackway along which the said carrying elements travel when in a continuous series, means arranged near the head end of the apparatus for pushing the said series of elements along the trackway, and other means arranged to take the carrying elements successively from the leading end of the said series and deliver them from the discharge end to the feed end of the apparatus to be again used.

9. In a conveying apparatus, a series of independent disconnected carrying elements, a trackway along which they travel in an end to end series, means for successively separating the leading element of the series at the discharge end of the apparatus, and means for pivotally supporting the individual carrying elements as they are separated from the series and conveying them while so supported to the head or feed end of the apparatus.

10. In a conveying apparatus, a series of independent disconnected carrying elements arranged to be brought together end to end to form a substantially continuous carrier which is adapted to receive and convey loose material, a trackway along which they are moved in end to end series, an endless conveyer for carrying the said elements from the delivery end of the apparatus to the feed end, a guide for successively directing the leading elements of the series to the said conveyer, and means for directing the said carrying elements from the conveyer to the head or starting end of the series.

11. In a conveying apparatus, a series of independent disconnected conveying elements each provided near one end with pivotal projections, a trackway along which the said carrying elements are moved in an end to end series, and an endless conveyer for taking the said carrying elements individually from the rear end of the apparatus to its head end, the said conveyer being provided with means for engaging the said projections of the carriers whereby during transit by the conveyer the carriers are suspended.

12. In a conveying apparatus, a series of independent disconnected carrying elements, arranged to be brought together to form a substantially continuous carrier which is adapted to receive and convey loose material, tracks upon which the said carrying elements rest and along which they are moved in an end to end series, means for directing the leading carrying elements of the series successively out of line with those remaining in the series, and means for directing the individual carrying elements from the discharge end of the apparatus to the head end of the apparatus.

13. In a conveying apparatus, a series of independent disconnected conveying elements, a trackway along which they travel, means for directing the individual carrying elements from the discharge end of the apparatus to the feed end thereof, and a guide chute at the feed end of the apparatus into which the said elements are delivered and where they may be collected preparatory to being delivered to the said trackway.

14. In a conveying apparatus, a series of independent disconnected conveying elements arranged when brought together to constitute a carrier that is adapted to receive and convey loose material, a trackway for supporting the said conveying elements in series, close together end to end, means for delivering loose material to the said conveying elements while arranged in said series, means for causing a discharge of the conveying elements, and means for returning them individually to the head end of the apparatus.

15. In an apparatus for conveying material, a series of independent disconnected conveying elements arranged when brought together to constitute a carrier that is adapted to receive and convey loose material, a trackway for supporting the said elements and along which they travel in a series, close together end to end, means for successively charging loose material into the said conveying elements, means at the end of the said trackway for separating the conveying elements successively from the said series and causing them to discharge, and means for individually returning the conveying elements to the head of the apparatus after they have discharged.

16. In a conveying apparatus, a series of independent disconnected open top carrying elements arranged to be brought together in series to form a substantially continuous carrier, and each being provided with laterally extending projections, a trackway along which the said elements move in an end to end series, and an endless carrying means arranged to engage with the said lateral projections of the carrying elements as they arrive at the discharge end of the apparatus and to convey them therefrom to the feed end of the apparatus.

17. In an apparatus for conveying material, a series of independent disconnected open top conveying elements arranged when brought together end to end to form a substantially continuous carrier along which the carriers are moved in an end to end series with their open ends upward, and means for separating the leading carrying elements one at a time from the series to permit their discharge, and for returning them to the head end of the machine, the returning means inclining downward toward the feed end of the machine whereby the carrying elements tend to perform the latter part of their return movement under the influence of gravity.

In testimony whereof I affix my signature, in presence of two witnesses.

ARTHUR S. DWIGHT.

Witnesses:
C. M. STANLEY,
IRENE A. REVIERE.